United States Patent
Wenzel et al.

(10) Patent No.: US 9,402,344 B1
(45) Date of Patent: Aug. 2, 2016

(54) POWER MANAGEMENT FOR SUGARCANE HARVESTERS

(71) Applicant: DEERE & COMPANY, Moline, IL (US)

(72) Inventors: Craig E. Wenzel, Chicago, IL (US); Alan D. Sheidler, Moline, IL (US); Kent M. Almeida, Napoleonville, LA (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 14/600,930

(22) Filed: Jan. 20, 2015

(51) Int. Cl.
*A01D 34/00* (2006.01)
*A01D 41/127* (2006.01)
*B60W 30/188* (2012.01)
*B60W 10/08* (2006.01)
*B60W 10/26* (2006.01)

(52) U.S. Cl.
CPC ............ *A01D 41/127* (2013.01); *B60W 10/08* (2013.01); *B60W 10/26* (2013.01); *B60W 30/188* (2013.01); *B60W 2720/10* (2013.01)

(58) Field of Classification Search
CPC ... B60W 20/108; B60W 10/08; B60W 10/02; A01D 41/127; A01D 69/025; B60K 6/445
USPC ............... 701/22, 31.4, 50; 74/661; 340/447; 477/5
See application file for complete search history.

(56) References Cited

U.S. PATENT DOCUMENTS

| | | | | |
|---|---|---|---|---|
| 6,062,009 A | * | 5/2000 | Caillouet | A01D 45/10 460/100 |
| 7,431,113 B2 | * | 10/2008 | Deppe | A01D 43/085 180/65.31 |

(Continued)

FOREIGN PATENT DOCUMENTS

EP          1563724 A1      8/2005

*Primary Examiner* — Thomas G Black
*Assistant Examiner* — Wae Louie
(74) *Attorney, Agent, or Firm* — Ingrassia, Fisher & Lorenz PC

(57) ABSTRACT

A sugarcane harvester and related method are disclosed for powering various sugarcane harvester operations. An energy storage device may be configured to receive electrical power from one or more electric machines for storage. The energy storage device may be configured to provide electrical power to the one or more electric machines to power operation of the one or more electric machines. An operating state of the sugarcane harvester may be identified, wherein the operating state is associated with one or more of a power requirement, a torque requirement, and an engine speed requirement for the sugarcane harvester. Based upon identifying the operating state, the one or more electric machines may be caused to receive electrical power from the energy storage device for conversion by the one or more electric machines to mechanical power, in order to power an operation of the sugarcane harvester.

20 Claims, 5 Drawing Sheets

(56) References Cited

U.S. PATENT DOCUMENTS

| | | | |
|---|---|---|---|
| 7,974,757 B2 | 7/2011 | Mackin et al. | |
| 7,992,370 B2* | 8/2011 | Sheidler | A01D 41/127 460/6 |
| 8,087,900 B2* | 1/2012 | Mackin | A01D 69/025 123/479 |
| 8,209,095 B2* | 6/2012 | Mackin | A01D 41/127 460/6 |
| 2007/0080236 A1* | 4/2007 | Betz | B60K 6/46 237/12.1 |
| 2012/0067432 A1* | 3/2012 | Vigholm | E02F 9/2217 137/14 |
| 2014/0107898 A1* | 4/2014 | Kawashima | E02F 9/123 701/50 |
| 2015/0197239 A1* | 7/2015 | Vilar | B60K 6/46 477/5 |
| 2015/0292608 A1* | 10/2015 | McKinzie | B60K 6/445 74/661 |

\* cited by examiner

POWER MANAGEMENT FOR SUGARCANE HARVESTERS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to powering various operations of a sugarcane harvester, including through the use of one or more energy storage devices.

BACKGROUND OF THE DISCLOSURE

Sugarcane harvesters may include various harvesting devices, including assemblies for cutting, chopping, sorting, transporting, and otherwise gathering or processing sugarcane plants. In certain sugarcane harvesters, such harvesting devices may include base cutter assemblies, feed rollers, cutting drums, and so on. In known harvesters, various harvesting devices may be hydraulically powered by various hydraulic motors, which may be powered, in turn, by an engine-driven pump.

To actively harvest crops, a sugarcane harvester may move along a field with harvesting devices engaged, the harvesting devices gathering and processing material from rows of sugarcane plants. Gathered sugarcane stalks may be chopped into billets for delivery to a trailing wagon, while leaves and trash may be separated from the billets and ejected into the field. Power requirements while actively harvesting sugarcane may vary based on many factors, including the local thickness of the sugarcane plants, the configuration of the field, and so on.

After harvesting a given row (or rows) of plants, it may sometimes be necessary to reposition a sugarcane harvester before harvesting a new row (or rows). Accordingly, unplanted areas or "headlands" are typically provided at the end of sugarcane rows. In some cases, the harvesting devices of the harvester may remain activated during this repositioning.

At various other times, sugarcane harvesters may idle in place or otherwise hold position without actively gathering or processing sugarcane. For example, a sugarcane harvester within a field may sometimes pause its harvesting in order to wait for an empty wagon to arrive so that cleaned billets may be loaded onto the wagon for transport.

SUMMARY OF THE DISCLOSURE

A sugarcane harvester and related method are disclosed for powering various sugarcane harvester operations. According to one aspect of the disclosure, an energy storage device may be configured to receive electrical power from one or more electric machines for storage. The energy storage device may be configured to provide electrical power to the one or more electric machines to power operation of the one or more electric machines. An operating state of the sugarcane harvester may be identified, wherein the operating state is associated with one or more of a power requirement, a torque requirement, and an engine speed requirement for the sugarcane harvester. Based upon identifying the operating state, the one or more electric machines may be caused to receive electrical power from the energy storage device for conversion by the one or more electric machines to mechanical power, in order to power an operation of the sugarcane harvester.

In certain embodiments, a hydraulic pump may be configured to provide pressurized hydraulic fluid to a hydraulic machine to execute the operation of the sugarcane harvester. To power the operation, the mechanical power from the one or more electric machines may be provided to the hydraulic pump, the mechanical power being used by the at least one hydraulic pump to provide the pressurized hydraulic fluid to the hydraulic machine.

In certain embodiments, a mechanical device may be configured to execute the operation using, at least in part, mechanical power received directly from at least one of the one or more electric machines. The mechanical device may include one or more of a cleaning fan, one or more feed rollers, a cane topper, and a cab climate control unit. Operation of the at least one of the one or more electric machines may be regulated based upon a ground speed of the sugarcane harvester, in order to provide mechanical power to the mechanical device. The operating speed of a harvesting device may be regulated, via the at least one of the one or more electric machines, independently of a current engine operating speed.

In certain embodiments, identifying the operating state may include identifying a current operating speed of the engine and comparing the current operating speed of the engine with a reference engine speed. The one or more electric machines may be caused to receive electrical power from the energy storage device based upon, at least in part, the comparing of the current operating speed and the reference engine speed. The one or more electric machines may be caused to receive electrical power from the energy storage device based upon, at least in part, the current operating speed being within an engine speed range, with respect to a target engine speed.

In certain embodiments, the one or more electric machines may be caused to provide energy to the energy storage device for storage based upon identifying a second operating state of the sugarcane harvester. The second operating state may correspond to the availability of surplus power from the engine.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
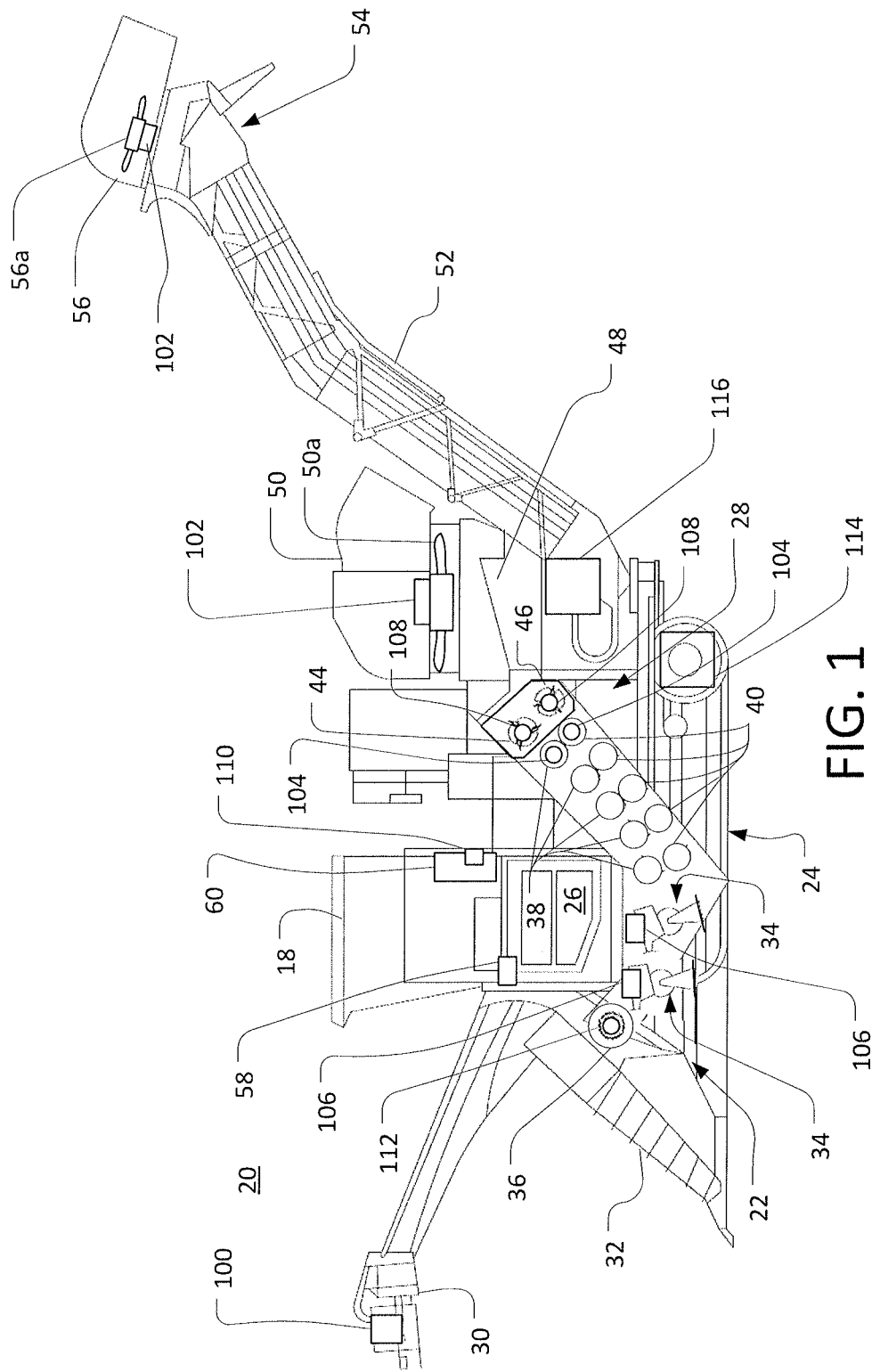
FIG. 1 is a simplified side view of an example sugarcane harvester according to this disclosure.

The following describes one or more example embodiments of the disclosed sugarcane harvester and method for powering various sugarcane harvester operations, as shown in the accompanying figures of the drawings described briefly above. Various modifications to the example embodiments may be contemplated by one of skill in the art.

As used herein the "direct" transmission or power (or transmission of power "directly") may indicate that power is transmitted between devices without a significant change in form. For example, mechanical power provided from one device (e.g., a motor) to another device (e.g., a mechanical implement) via various shafts and gears may be considered as transmitted "directly" between the two devices because the power is transmitted solely in mechanical form. In contrast, where mechanical power from one device is converted to hydraulic form for transmission to another device, then reconverted to mechanical form for execution of various operations, the power may not be considered as transmitted "directly" between the two devices.

As noted above, a sugarcane harvester (or "harvester") may engage in various activities during its operation. At various times and during certain activities, various harvesting devices of the harvester may be activated, often in conjunction with other harvester systems. For example, during active harvesting of sugarcane plants, an engine of a harvester may operate to provide working power. In known configurations, this power may be provided to a hydraulic pump to drive the pump. The pump, in turn, may supply pressurized hydraulic flow to various hydraulic motors, which may be utilized to power various harvesting (and other) devices and thereby execute various operations of the harvester.

Various issues may arise with regard to this arrangement of an engine and a pump to power harvester operations. It may be useful, for example, to operate an engine near its full power capacity, or at a relatively efficient engine speed (e.g., at a "rated" speed). Under certain operating states, however, the power provided to the pump by the engine, at a desired operating state of the engine, may be insufficient to execute various harvester operations in the manner desired. For example, a slug of sugarcane may impose increased power demands on the harvester feed train, or varying field conditions may impose increased power demands on basecutters or other harvesting devices. In these and other scenarios, the engine of the harvester may not be able to supply sufficient power to appropriately drive the relevant harvesting (and other) devices, at least at the current operating state of the engine. Accordingly, the harvester may suffer from power deficiencies (e.g., as manifested in reduced performance of various harvesting devices), or the engine may be forced to operate in a less efficient state (e.g., at a less efficient engine speed).

In contrast, under certain operating states, the power available from the engine may substantially exceed the power required by various devices, including harvesting devices and others. For example, while a harvester executes an end-of-row turn (i.e., turns in the headlands of a field in order to harvest a new row of sugarcane) or waits for a trailing wagon to offload harvested sugarcane at another location, the power from the engine may exceed that required for the current operation of the relevant harvester systems (e.g., the harvester wheel drives, cab climate control devices, various harvesting devices, and so on). Accordingly, operation of the engine may result in wasted power and fuel, with respect to the current operational needs of the harvester.

The disclosed sugarcane harvester (and method) may address these and various other issues. In certain embodiments, for example, the disclosed harvester may include various electric machines (e.g., various electric motor/generators, various dedicated electric motors, or various dedicated electric generators) as well as an energy storage device ("ESD") for storage of electric energy (e.g., a battery). During operations in which an engine of the harvester is providing surplus power with respect to current power needs (e.g., during an end-of-row turn, during the harvesting of less densely planted portions of a field, while waiting for a wagon to unload and return, and so on), the electric machines may be directed to convert mechanical power from the engine to electrical power and that electrical power may be routed to the ESD for storage as electrical energy. During operations in which power needs for various devices of the harvester (e.g., various harvesting devices) exceed the power currently available from the engine, energy from the ESD may then be converted to mechanical energy by the electric machines to supplement the power provided by the engine.

In certain embodiments, mechanical power from the electric machines (i.e., converted electrical power from the ESD) may be routed through a hydraulic system for various operations. For example, an electric motor (or motor/generator) may receive electrical power from the ESD, convert the electrical power to mechanical power, and provide the mechanical power (e.g., via a gearbox or other transmission assembly) to a hydraulic pump. The pump may then utilize the mechanical power (in addition to any power received directly from the engine) in order to power various hydraulic motors throughout the harvester. In other configurations, the electric motor (or motor/generator) may instead (or additionally) provide mechanical power directly to a particular harvesting (or other) device. For example, an electric motor may be configured to directly power a cane topper, feed roller, cleaning fan, drive wheel or track, or other device, by converting electrical power from the ESD to mechanical power and providing the mechanical power directly (including, for example, via various gears or other mechanical elements) to the relevant device.

As will become apparent from the discussion herein, the disclosed harvester (and method) may be used advantageously in a variety of settings and with a variety of machinery. In certain embodiments, referring now to FIG. 1, the disclosed harvester (and method) may be implemented in the form of a sugarcane harvester 20. It will be understood, however, that the disclosed harvester (and method) may be implemented for harvesters of different configurations than the harvester 20 of FIG. 1.

The harvester 20 is presented in a side view in FIG. 1, with the front of the harvester 20 facing to the left. Accordingly, certain right-side components of the harvester 20 may not be visible in FIG. 1. The harvester 20 includes a main frame 22 supported on track assemblies 24 or wheels (not shown), with a cab 18 to house an operator. A power plant assembly 26 supplies power for driving the harvester along a field and for powering various driven components of the harvester 20. In certain embodiments, the power plant assembly 26 may include an internal combustion engine (not shown in FIG. 1), which may provide mechanical power to a main hydraulic pump (not shown in FIG. 1) in order to supply pressurized working fluid to various hydraulically operated devices. Various driven components of the harvester 20 (e.g., various harvesting devices) may accordingly be powered by hydraulic motors (not shown) configured to receive hydraulic power from the main hydraulic pump via an embedded hydraulic system (not shown).

Various harvesting devices may be configured to interoperate in order to gather and process sugarcane. In the embodiment depicted, for example, a cane topper 30 extends forward of the frame 22 in order to remove the leafy tops of sugarcane plants (not shown), and a set of crop dividers 32 (only the left-side divider 32 shown in FIG. 1) is configured to guide the remainder of the sugarcane plant into a forward opening in the frame 22 for further processing. As the harvester 20 moves across a field, plants passing between the crop dividers 32 may be deflected downward by one or more knockdown rollers 36 before being cut near the base of the plants by a one or more base cutter assemblies 34 mounted on the main frame 22. Rotating disks, guides, or paddles (not shown) on the basecutter assemblies 34 may further direct the cut ends of the plants upwardly and rearward within the harvester 20 toward successive pairs of upper and lower feed rollers 38 and 40. The feed rollers 38 and 40 may be rotatably supported by a chassis 28 (e.g., a welded extension of the frame 22) in order to convey the stalks toward chopper drums 44 and 46 for chopping into relatively uniform billets.

The chopper drums 44 and 46 are configured to rotate in opposite directions in order to chop the passing stalks into billets and propel the billets into a cleaning chamber 48 at the base of a primary extractor 50. The primary extractor 50 may then utilize a powered fan 50a to extract trash and debris from the cleaning chamber 48, while allowing the billets of sugarcane stalks to drop onto a loading elevator 52 with a forward end located at the bottom of the cleaning chamber 48. The loading elevator 52 may then convey the cleaned billets upward to a discharge location 54, below a secondary extractor 56 (with a secondary cleaning fan 56a), where the billets may be discharged into a trailing truck or other receptacle (not shown).

In certain embodiments, one or more control devices, such as controller 58, may be included in (or otherwise associated with) the harvester 20. The controller 58, for example, may include one or more computing devices including various processor devices and various associated memory architectures. In certain embodiments, the controller 58 may additionally (or alternatively) include various other control devices such as various electro-hydraulic valves and hydraulic circuits, various electronic control circuits and devices (e.g., various power electronics devices or programmable electronic circuits), and so on. In certain embodiments, the controller 58 (or another control device) may be in communication with various switches, controls and other interfaces or input devices (not shown) in the cab 18, as well as with various sensors, actuators, or other devices distributed throughout the harvester 20. For example, the controller 58 may be in communication with an engine speed sensor (not shown), a fuel sensor (not shown), various power electronics (not shown) for control of various electric machines, and so on. In certain embodiments, the controller 58 (or another control device) may be a remotely located control device that communicates with various devices and systems of the harvester 20 via wireless or other communication means.

Figure 2:
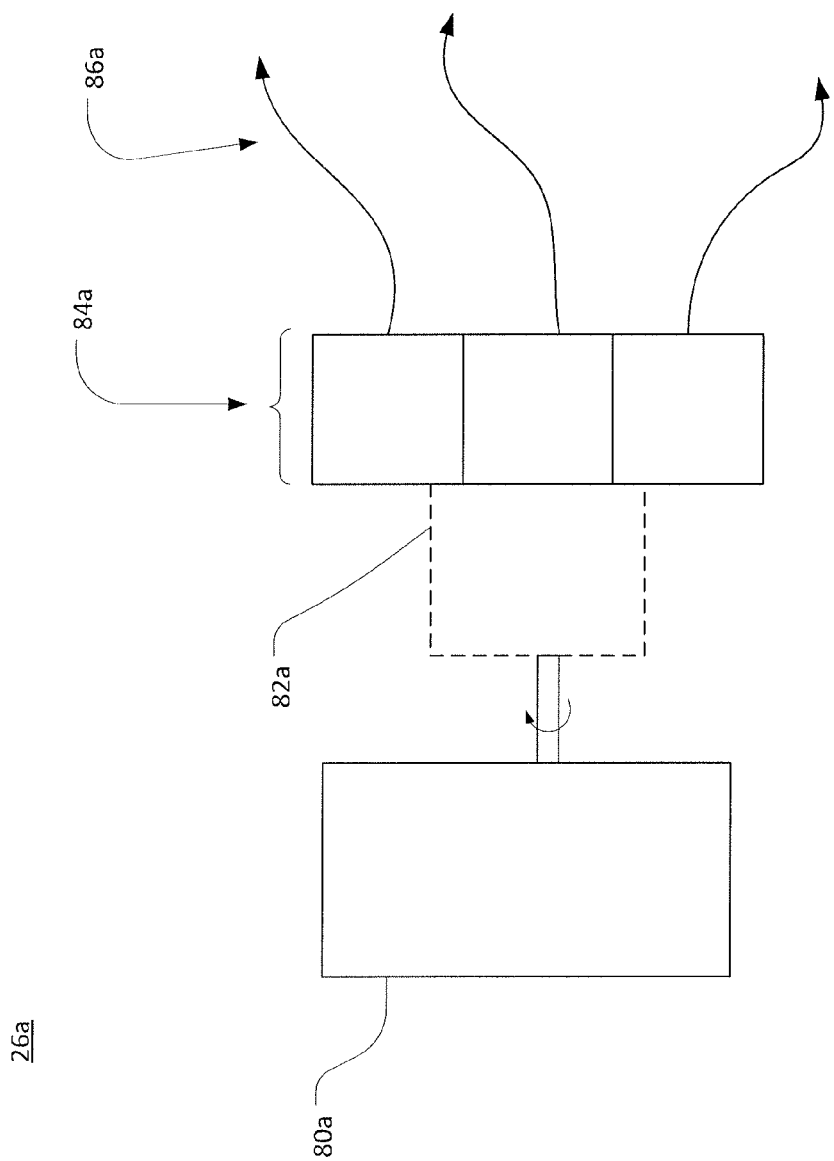
FIG. 2 is a schematic view of a known arrangement for powering operations of the sugarcane harvester of FIG. 1.

Referring also to FIG. 2, in known configurations a power plant assembly 26a may include an internal combustion engine 80a configured to drive one or more hydraulic pumps 84a. In certain embodiments, a gearbox 82a may be provided between the engine 80a and the pumps 84a. This may be useful, for example, to provide rotational input to the pumps 84a at a different speed from the rotational output of the engine 80a. In certain embodiments, the engine may drive rotation of the pumps 84a without intervening gear assemblies. As such, for example, rotational input may be provided to the pumps 84a at the same speed as the rotational output of the engine 80a. In such a case, the output of the pumps 84a may accordingly depend upon the current rotational speed of the engine 80a.

Various hydraulic lines 86a may extend from the pumps 84a to various devices of the harvester, in order to power operation of those devices. For example, the hydraulic lines 86a may extend from the pumps 84a to various hydraulic motors for the operation of a basecutter assembly, one or more feed rollers, a cane topper, one or more cleaning fans, and so on. As noted above, in certain embodiments, the rotation of the pumps 84a may depend directly on the current operating speed of the engine 80a. As such, in certain embodiments, the power provided to the various hydraulic motors may also depend directly on the current operating speed of the engine 80a.

Figure 3:
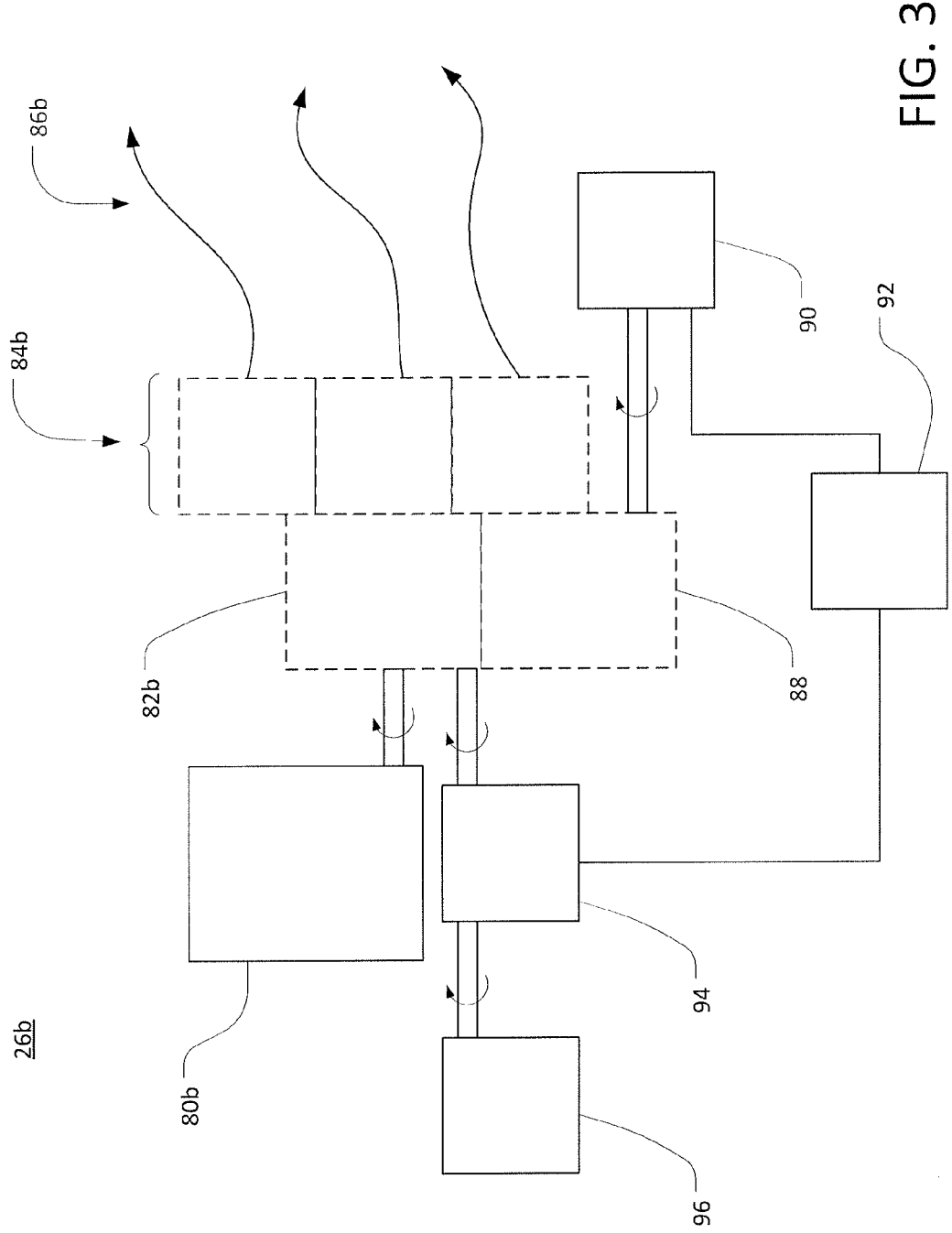
FIG. 3 is a schematic view of an arrangement for powering operations of the sugarcane harvester of FIG. 1, according to this disclosure.

Referring also to FIG. 3, in an embodiment of the disclosed harvester, a power plant assembly 26b may also include an internal combustion engine 80b. In certain embodiments, the internal combustion engine 80b may be configured to drive one or more hydraulic pumps 84b such that pressurized hydraulic fluid is provided to various devices (e.g., various hydraulically operated harvesting devices) via hydraulic lines 86b. In certain embodiments, a gearbox 82b may be provided between the engine 80b and the pumps 84b. In certain embodiments, the engine may drive rotation of the pumps 84b (or other devices) without intervening gear assemblies. In certain embodiments, as discussed in greater detail below, the hydraulic pumps 84b may be excluded from the power plant assembly 26b.

In the power plant assembly 26b, one or more electric machines may be provided. For example, as depicted, an electric generator 90 is configured to receive mechanical power from the engine 80b and convert the mechanical power to electricity. The electricity may then be routed to an ESD 92, which may be configured as a battery, a pack of multiple batteries, a capacitor, or another ESD. As appropriate, energy may then be released from the ESD 92 in order to supplement (or replace) power from the engine 80b.

As depicted, energy from the ESD 92 may be released, as appropriate, to an electric motor 94 for conversion to mechanical power. This mechanical power may then be used to power various operations of the harvester 20. In certain embodiments, including as depicted, mechanical power from the motor 94 may be routed to one or more of the hydraulic pumps 84b. In this way, the motor 94 may provide power to the pumps 84b to supplement (or replace) power from the engine 80b. In certain embodiments, power may be routed from the motor 94 to the pumps 84b via the gearbox 82b (or another gearbox). For example, the gearbox 82b may include a planetary gear set or other summing gear set, such that mechanical power from the motor 94 may be combined with mechanical power from the engine 80b to drive the pumps 84b. In certain embodiments, power may be routed from the motor 94 to the pumps 84b without intervening gear assemblies.

In certain embodiments, different gearboxes may be utilized to route power from the engine 80b to the generator 90 and to route power from the motor 94 to the pumps 84b. For example, a gearbox 88 may be configured with various spur gears to provide an appropriate rotational speed to the generator 90 (e.g., based upon the expected operating speed or speeds of the engine 80b). Power from the motor 94 may then be routed through the gearbox 82b (e.g., configured as a summing planetary gear set) in order to power the pumps 84b (or various other devices).

In certain embodiments, a single electric machine may be utilized in place of a pair of electric machines. For example, rather than a dedicated generator 90 and dedicated motor 94, a single electric machine (not shown) may be configured to operate selectively as either a motor or a generator. In this way, an electric machine may receive mechanical power from the engine 80b and convert that power to electricity to charge the ESD 92 (or other storage device), and the same electric machine may receive electrical power from the ESD 92 and convert that electrical power to mechanical rotation to power the pumps 84b. Other configurations are also possible, with various numbers and arrangements of various electric machines.

In certain embodiments, the electric motor 94 (or another electric machine) may be configured to directly power a mechanical device other than the pumps 84b. For example, as depicted in FIG. 3, the electric machine 94 may be configured to provide rotational power to a mechanical device 96, which device 96 may not be configured to utilize pressurized hydraulic (or other) fluid to execute various functions. The mechanical device 96 may accordingly be utilized to execute various operations of the sugarcane harvester (e.g., to operate various harvesting devices) without necessarily converting the mechanical power to a pressurized hydraulic flow (or vice versa).

The mechanical device 96 (or multiple such devices) may be configured in various ways and may be located (along with the electric motor 94, in various embodiments) at various locations throughout the harvester 20. Referring again to FIG. 1, for example, the mechanical device 96 may be configured as a cutting device for the cane topper 30, as one of the fans 50a or 56a, as a rotating assembly for the feed rollers 38 and 40, as a cutting device for one of the basecutter assemblies 34, as a rotating assembly for the chopper drums 44 and 46, as a compressor or pump for a cab climate control unit 60 (e.g., a compressor or pump for an air conditioning unit), as a rotating assembly for the knockdown roller 36, and so on. As such, for example, the electric motor 94 may be configured as one or more of a motor 100 for the cane topper 30, one or more fan motors 102 for the cleaning fans 50a and 56a, one or more embedded (or other) motors 104 for the feed rollers 38 and 40, one or more motors 106 for the basecutter assemblies 34, one or more embedded (or other) motors 108 for the chopper drums 44 and 46, a motor 110 (e.g., a compressor motor) for the climate control unit 60, an embedded (or other) motor 112 for the knockdown roller 36, and so on.

Other motors may be provided, in certain embodiments. For example, electric motors (e.g., a motor 114) may be provided at the track assembly 24 (or wheels) of the harvester 20 in order to drive the harvester 20 for forward and reverse travel. Similarly, an electric motor (e.g., a motor 116) may be provided to operate the elevator 52 of the harvester 20, or at various other locations.

In certain embodiments, referring again to FIG. 3, no hydraulic pumps 84b, or a reduced number or capacity of the pumps 84b, may be provided as part of the power plant assembly 26b. For example, where one or more electric motors 94 are utilized to provide mechanical power directly to various devices for various harvester operations (e.g., as described above), those devices may not require hydraulic power from the pumps 84b and the pumps 84b may be excluded from the power plant assembly 26b. Alternatively, because the one or more motors 94 may provide at least some power to various devices of the harvester 20 in place of the hydraulic power from the pumps 84b, a reduced number of pumps 84b or various pumps 84b of reduced size or capacity may be utilized.

In certain embodiments, the use of the power plant assembly 26b (or similar assembly), as discussed above, may facilitate the use of a smaller or less powerful engine 80b for the harvester 20. This may result in reduced cost in manufacturing and maintaining the harvester 20, reduced space requirements for the engine 80b, and various other benefits.

Various operations for powering the various devices of a sugarcane harvester (e.g., of the harvester 20), including various of the operations described above, may be implemented as part of an harvester power management ("HPM") method. Such a method may be implemented automatically (e.g., as controlled by the controller 58), manually (e.g., as controlled by an operator via various interfaces and input devices (not shown)), or as a combination of automatic and manual operations (e.g., as controlled manually by an operator via various input devices and automatically by the controller 58). It will be understood, accordingly, that an HPM method may be implemented using various computing devices or by various hydraulic, electronic, mechanical, electro-hydraulic, electro-mechanical, or other control devices, in various combinations. In certain embodiments, an HPM method (or portions thereof) may be implemented by controllers or other devices that are remotely located from a relevant harvester.

Figure 4:
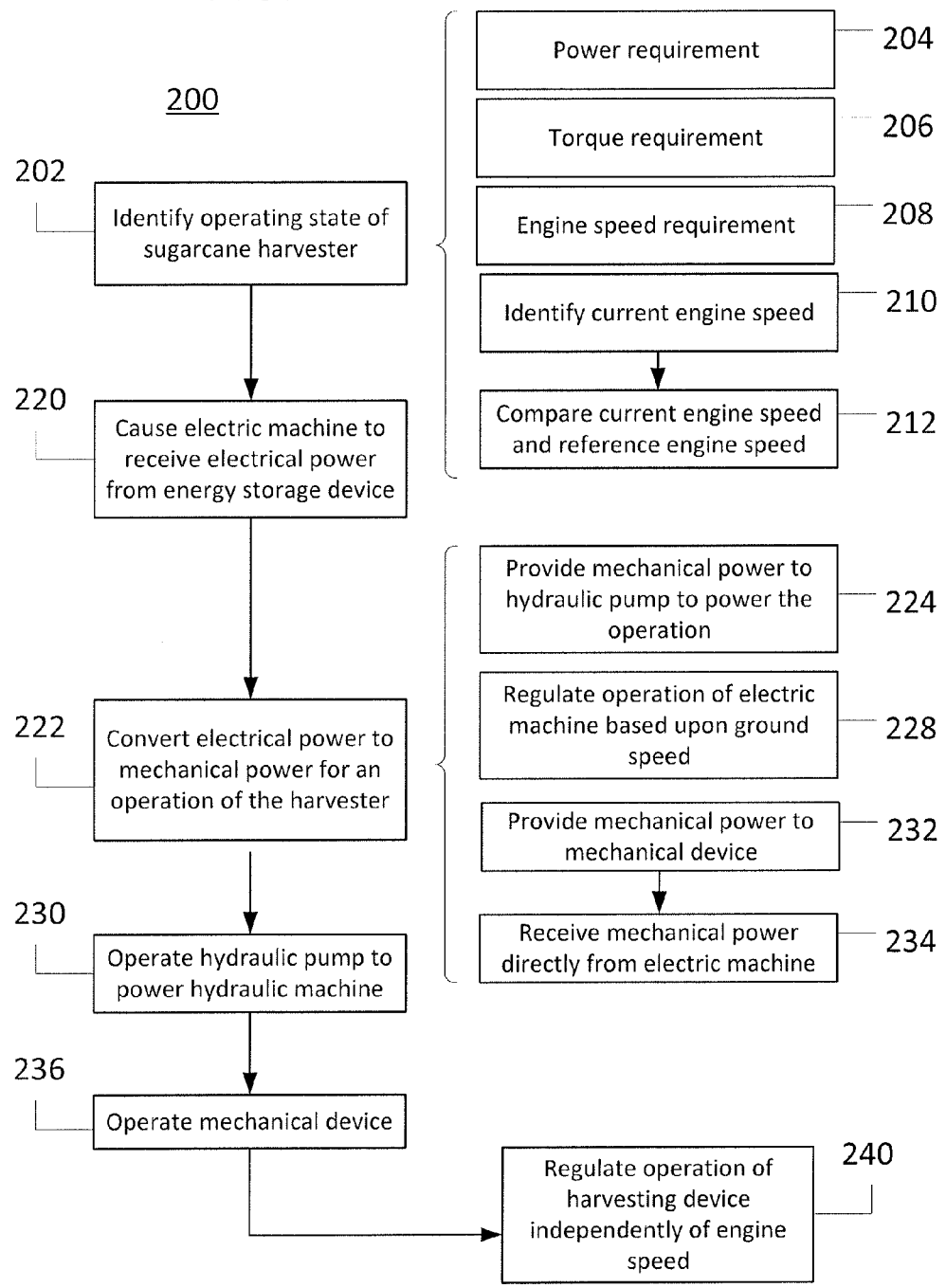
FIGS. 4 and 5 are diagrammatic view of aspects of a power management method for the sugarcane harvester of FIG. 1.

Referring also to FIG. 4, once an ESD has been appropriately charged (e.g., as described in greater detail below), various aspects of an HPM method 200 may execute to power various sugarcane operations using energy from the ESD. To that end, in certain implementations, the method 200 may include identifying 202 an current operating state of a sugarcane harvester (e.g., of the harvester 20). An operating state may represent the current state of various systems of the relevant harvester (e.g., the current state of the engine, of one or more harvesting devices, and so on) and may accordingly correspond to a power requirement 204, torque requirement 206, or engine speed requirement 208 for the harvester. For example, during active harvesting of a sugarcane field, an identified 202 current operating state of the harvester 20 may correspond to a particular power requirement 204 (or torque requirement 206, or engine speed requirement 208) for effectively operating various harvesting devices such as the cane topper 30, the cleaning fan 50a, the feed rollers 38 and 40, and so on.

As a harvester encounters various transient (or other) phenomenon, the power requirements 204 or other aspects of the current operating state may change accordingly. For example, as the harvester 20 encounters thicker areas of sugarcane or experiences plugging along the feed train, the power requirements for operation of the basecutters 34, the feed rollers 38 and 40, the chopper drums 44 and 46, and so on, may increase from one or more baseline power requirements. As such, it may be useful to continuously, or at least regularly, identify 202 the current operating state of the relevant harvester (e.g., using the controller 58 and various sensors (not shown)) in order to inform the (potential) use of the ESD.

In certain implementations, identifying 202 the current operating state of a harvester may include identifying 208 a current engine speed and comparing 212 the identified 208 current engine speed to a reference engine speed. For example, with respect to the harvester 20, identifying 202 the current operating state may include identifying 208 a current operating speed of the engine 80b and comparing 212 the identified 208 engine speed with the rated speed for the engine 80b.

In certain implementations, this identifying 208 and comparing 208 of engine speeds may be useful, in order to indicate when the engine 80b may be operating relatively inefficiently and, as such, when use of an ESD may be appropriate. For example, in certain implementations, a particular target speed (i.e., a particular rated speed) may be determined for the engine 80b, in order to provide relatively efficient operation of the engine 80b. An operator (or an automated control system) may accordingly endeavor to maintain the operating speed of the engine 80b within a particular band around (i.e., within a range of speeds above, below, or above and below) a target engine speed. Increased power demands on the engine 80b, however, may cause the engine 80b to deviate from the target speed and, accordingly, to operate with reduced efficiency. Accordingly, identifying 208 the current operating speed of the engine 80*b* (and comparing 212 that speed to a reference) may provide a useful indicator of a power deficiency at the engine 80*b*.

Identifying 202 the current operating state of an harvester may additionally (or alternatively) include identifying various other parameters. For example, identifying 202 the current operating state of a harvester may include identifying current (or historic) fuel consumption via a fuel sensor (not shown), identifying a current ground speed via a ground speed or shaft speed sensor (not shown), identifying the state of various control levers or other interfaces (not shown) in the cab 18, and so on.

Based upon the identified 202 current operating state of the harvester, a power deficiency of the engine may be identified, with respect to current operations of the harvester. For example, as noted above, where a decrease in engine speed below the rated speed has been identified 208, this may correspond to a deficiency in output power from the engine with respect to current harvester operations.

Where a power deficiency of the engine has been identified (i.e., where the available power from the engine is insufficient to execute various ongoing operations as desired), the method 200 may then include causing 220 an electric machine to receive electrical power from an ESD. The electric machine may then convert 222 the received electrical power to mechanical power in order to power one or more ongoing operations of the harvester. As noted above, the electric machine may be a dedicated motor, or a machine configured to operate as either a motor or a generator, as required.

With respect to the harvester 20, for example, when a power deficiency of the engine 80*b* has been identified, the controller 58 may cause the ESD 92 to release stored energy to the motor 94 (or to another electric machine). The motor 94 may then convert 222 the received electrical power to mechanical power in order to power one or more ongoing operations of the harvester. In certain implementations, the motor 94 may provide power to the various pumps 84*b* to replace (or supplement) power from the engine 80*b* for the powering of various hydraulic devices. In certain implementations, the motor 94 may provide power to the mechanical device (or devices) 96, in order to directly power the execution of various operations.

This conversion 222 of electrical power from the ESD 92 to mechanical power may be useful in a variety of conditions. For example, during active harvesting, where the engine 80*b* is operating relatively efficiently (e.g., at or near the rated speed), the various devices of the harvester 20 may be consuming all or nearly all of the available power from the engine 80*b*. Accordingly, if an additional power demand is made (e.g., due to a slug of sugarcane material passing through the harvester 20), the operating speed of the engine 80*b* may tend to fall, which may result in decreased efficiency and otherwise reduced performance. Alternatively (or additionally), other detrimental effects may occur, including reduction in the ground speed of the harvester 20. By identifying 202 the power deficiency and causing 220 the flow of stored energy from the ESD 92 to the motor 94, the method 200 may make up the power deficiency of the current operating state and, accordingly, avoid (or mitigate) the reduction in engine speed or other performance detriment.

In certain implementations, the electric machine may be configured to provide 224 mechanical power to a hydraulic pump. The pump may then operate 230, utilizing this mechanical power in order to provide pressurized fluid to various hydraulic devices, in order to power various harvester operations. With respect to the harvester 20, for example, the motor 94 may be configured to provide mechanical power to the hydraulic pumps 84*b* (e.g., via the gearbox 82*b*), such that the pumps 84*b* may hydraulically power various harvester operations.

In certain implementations, the electric machine may be configured to provide 232 power to various mechanical devices. In certain implementations, such mechanical devices may be configured to receive 234 mechanical power from the electric machine directly (e.g., without an intervening conversion of the mechanical power to a hydraulic flow) and thereby operate 236 to execute various functions. For example, electrical power received from the ESD may be converted 222 to mechanical power by an electric machine, and the mechanical power transmitted directly (i.e., without conversion to hydraulic power) from the electric machine to a mechanical device such that the mechanical device operates 236 to execute various functionality. With respect to the harvester 20, for example, the motor 94 may be configured to provide mechanical power directly to the mechanical device 96 rather than (or in addition to) providing mechanical power to the pumps 84*b* for conversion to pressurized hydraulic flow. As noted above, the mechanical device 96 may be configured to drive operation of various harvesting devices. Accordingly, the motor 94 may be utilized, via the device 96, to directly power operation of various harvesting devices.

In certain implementations, the electric machine may be configured to supplement power from the engine, in order to power various harvester operations. For example, a summing gearbox (e.g., the gearbox 82*b*) may be provided between the electric machine and a hydraulic pump, such that mechanical power from the electric machine may be summed with mechanical power from the engine in order to power the pump. In certain embodiments, a summing gearbox may be configured as a summing planetary gear set, or in various other ways.

In certain implementations, the electric machine may be configured to replace power from the engine, in order to power various harvester operations. For example, as noted above, the electric machine may be configured to directly power various harvesting (or other) devices rather than to power the devices via an intermediary pump. Likewise, the electric machine may be configured to power various pumps (e.g., the pumps 84*b*) without assistance from the engine.

In certain implementations, the electric machine may be configured to operate even when the engine is not operating. For example, the method 200 may include identifying 202 that the current operating state of the harvester includes an engine shut off condition (e.g., due to engine stall, or an operator turning a key to the "shut-off" position). In such a case, the electric machine may convert 222 stored electrical power to mechanical power in order to power various harvester operations even though the engine may not be actively providing power to the harvester. For example, when the harvester 20 has paused active harvesting in order to wait for a wagon to unload and return to the field, an operator may turn off the engine 80*b* in order to conserve fuel. The motor 94 and ESD 92 may then be operated to power various vehicle operations, such as cooling of the cab 18 with the climate control unit 60.

In certain implementations, the method 200 may include causing 220 flow of energy from an ESD to an electrical motor (or other machine) based upon a particular speed band around a rated engine speed. For example, an operator (or technician) may set a speed band of 20 to 50 rpm around (i.e., above, below, or above and below) a set engine speed, in order to define an acceptable range of engine speeds around the rated speed. If an identified 208 engine speed falls outside this speed band, the method 200 may cause 220 the release of stored energy for ongoing harvester operation.

In certain implementations, an operator interface may be provided such that an operator may customize such a speed band, a rated engine speed, or both, in order to target the method 200 to particular operations. For example, where an operator prefers to operate the engine at relatively high speeds (e.g., with respect to a typical set point), the operator may be able to adjust the reference speed (e.g., for the comparing 212 of engine speeds) and speed band (as discussed above), for execution of the method 200.

As noted above, the converted 222 power may be utilized to operate a non-hydraulic mechanical device, via direct transmission of mechanical power (i.e., without first converting the power to hydraulic form), in order to execute various operations. Various benefits may accrue with respect to such a direct-power configuration. In certain implementations, for example, it may be useful to divorce the operating speed of various devices (e.g., various harvesting devices) from the operating speed of the relevant engine. In this way, operation of one or more harvesting (or other) devices may be regulated 240 independently of engine speed. With respect to the harvester 20, for example, it may be useful to operate one or both of the fans 50*a* and 56*a* at a speed that is relatively independent of the speed of the engine 80*b*. Where the engine 80*b* is providing power to the fans 50*a* and 56*a* via the pumps 84*b*, such operation may be difficult, or may require relatively costly control systems. However, where the engine 80*b* provides power to the fans via the motor 94 (and the generator 90 or the ESD 92), it may be relatively effective to regulate 240 the fan speed (or other aspect of fan operation) independently of the engine speed.

Figure 5:
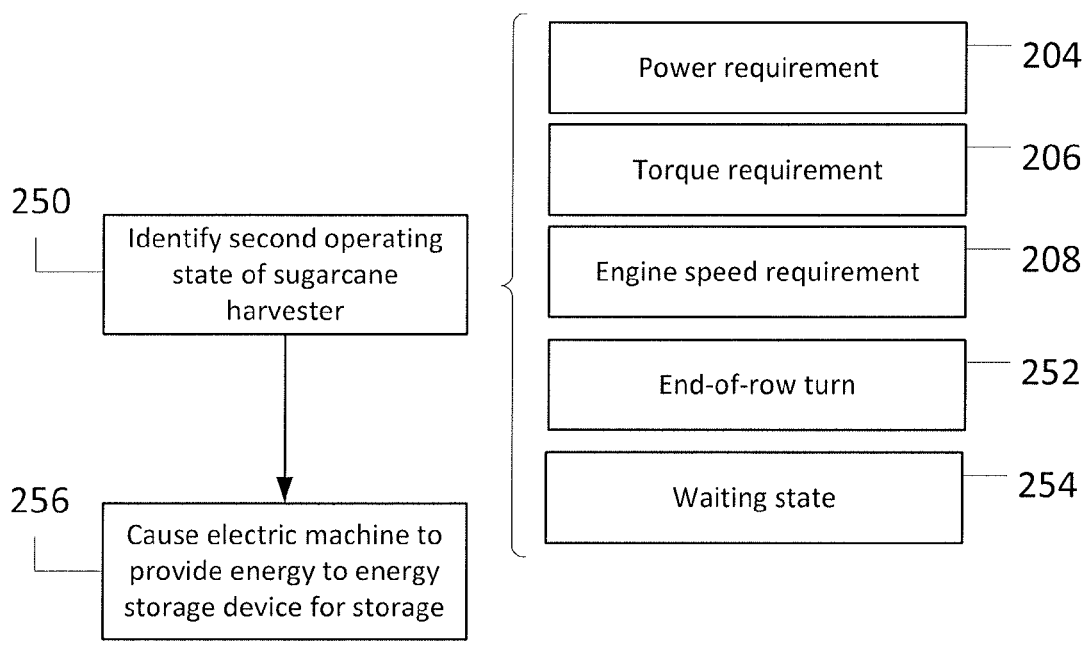

Similarly, where various harvester devices are powered by an electric machine rather than a hydraulic pump, it may be possible to regulate 228 operations of these electric machines (and the associated devices) based upon the ground speed of the harvester. With respect to the harvester 20, for example, the controller 58 may be configured identify a current ground speed of the harvester 20 (e.g., via one or more speed sensors), and to regulate the output speed of the motor 94 (or other motors) accordingly. In this way, an relatively effective speed (or speeds) may be provided at various devices including the cane topper 30 (via the motor 100), the cleaning fans 50*a* and 56*a* (via the motors 102), the feed rollers 38 and 40 (via the motors 104), the basecutter assemblies 34 (via the motors 106), the chopper drums 44 and 46 (via the motors 108), the climate control unit 60 (via the motor 110), the knockdown roller 36 (via the motor 112), and so on Referring also to FIG. 5, the HPM method 200 may include various operations for charging the ESD. In certain implementations, the ESD may be charged based upon first identifying 250 an appropriate operating state of the harvester. As noted above, an operating state may represent the current state of various systems of the relevant harvester and may accordingly correspond to a power requirement 204, torque requirement 206, or engine speed requirement 208 for the harvester 20. In certain implementations, an operating state (including an identified 250 operating state) may include current execution of a particular operation, including an end-of-row turn 252, or operation of the harvester in a waiting state 254. A waiting state 254 may include, for example, a state in which the engine of the harvester is operating, but the harvester is not actively harvesting. For example, a harvester that is idling in a field while waiting for a wagon to return from unloading may be identified 250 as operating in a waiting state 254.

Based upon identification 250 of an appropriate operating state, it may be determined that the power currently available from the engine of the harvester may exceed the power that is required for current operations. For example, while the harvester 20 is in a waiting state 254 (e.g., while waiting for a trailing wagon to return), the current operations of the harvester 20 may require relatively little power with respect to the actual capacity of the engine 80*b* at rated speed. Accordingly, during the waiting state 254, the engine 80*b* may be providing significant surplus power beyond the current power requirements. Similarly, during an end-of-row turn 252 (e.g., a turn in the headlands between active harvesting of successive rows) various harvesting devices may not be actively engaged with sugarcane crops, such that the engine 80*b* may provide a degree of surplus power with respect to the current power requirements of the harvester 20. Indeed, even during active harvesting, the engine 80*b* may sometimes provide power in excess of the power required for the current harvesting (and other) operations. For example, in anticipation of slugs, portions of a field with thicker mats of sugarcane plants, and so on, the engine 80*b* of the harvester 20 may be rated to provide somewhat more power than is expected for normal harvesting. Accordingly, at various times during active harvesting, the engine 80*b* may provide surplus power beyond that currently required for harvesting. As such, in these and other scenarios, the availability of surplus power from an engine may be identified based upon the identification 250 of the current operating state of the harvester.

Where surplus power is available from a harvester engine, the method 200 may further include causing 256 an electric machine to provide energy to the ESD for storage. For example, where an identified 250 operating state indicates the availability of surplus power from an engine, the controller 58 may cause 256 the electric machine to convert mechanical power from the engine to electrical energy for storage in the ESD. As described in detail above, this stored energy may later be released from the ESD to power various operations of the harvester.

In certain implementations, identifying 250 an operating state to guide charging of the ESD may include identifying a current engine speed of the harvester. For example, the controller 58 may be configured to detect (e.g., via various sensors (not shown)) a current operating speed of the engine 80*b*. The controller 58 may then compare the current operating speed of the engine 80*b* with a reference speed (e.g., the rated speed of the engine) in order to assess the available engine power. Based upon this comparison, the electric machine may then be caused 256, as appropriate, to provide energy to the ESD for storage.

In certain implementations, the ESD may be charged at different rates depending on the particular operating state identified 250. For example, a linear or other relationship may be established between engine speed and charging rate, such that the rate at which a battery (or other ESD) is charged depends, at least in part, on the engine speed. In certain implementations, the electric machine may be caused 256 to provide energy to the ESD for storage only when the identified engine speed falls within a particular band around the rated speed (or another reference).

Other factors may also be utilized in charging the ESD. For example, an appropriate operating state for charging (or, generally, the availability of surplus power from an engine) may be identified 250 based upon fuel consumption via a fuel sensor (not shown), identifying a current ground speed via a ground speed or shaft speed sensor (not shown), identifying the state of various control levers or other interfaces (not shown) in the cab 18, and so on.

The relevant electric machine may be caused 256 to provide energy to the ESD for storage in various ways. In certain implementations, for example, power electronics associated with the electric machine may be utilized in order to control the charging of a battery (or other device). In certain implementations, other devices may be utilized. For example, a clutch device (not shown) or similar mechanism may be controlled to route power from the engine to the electric machine (and, thereby, to the ESD) at certain times but not others.

As will be appreciated by one skilled in the art, certain aspects of the disclosed subject matter may be embodied as a method, system, (e.g., a work vehicle control system included in the harvester 20) or computer program product. Accordingly, certain embodiments may be implemented as hardware, as software (including firmware, resident software, micro-code, etc.), as a combination of software and hardware, or otherwise. Furthermore, certain embodiments may take the form of a computer program product on a computer-usable storage medium having computer-usable program code embodied in the medium.

Any suitable computer-usable or computer-readable medium may be utilized. The computer-usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer-readable signal medium may be non-transitory and may be any computer-readable medium that is not a computer-readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions (or otherwise). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Relevant computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Relevant computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, combinations of special purpose hardware and computer instructions, or otherwise.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A sugarcane harvester comprising:
   an engine;
   one or more electric machines configured to operate as at least one of a motor and a generator;
   an energy storage device configured to at least one of receive electrical power from the one or more electric machines for storage, and provide electrical power to the one or more electric machines to power operation of the one or more electric machines; and
   a controller configured to:
      identify an operating state of the sugarcane harvester, wherein the operating state is associated with one or more of a power requirement, a torque requirement, and an engine speed requirement for the sugarcane harvester;
      based upon, at least in part, identifying the operating state, cause the one or more electric machines to receive electrical power from the energy storage device for conversion by the one or more electric machines to mechanical power, in order to power an operation of the sugarcane harvester;
      provide the mechanical power to one or more of a hydraulic pump and a mechanical device, in order to power an operation of the sugarcane harvester; and
      one or more of:
         operate the hydraulic pump with the mechanical power from the one or more electric machines to provide pressurized hydraulic fluid to a hydraulic machine of the sugarcane harvester in order to execute the operation; and
         operate the one or more electric machine to provide the mechanical power directly to the mechanical device, the mechanical device operating with the mechanical power from the one or more electric machines to execute the operation.

2. The sugarcane harvester of claim 1, wherein the one or more mechanical devices include one or more of a cleaning fan, one or more feed rollers, a cane topper, and a cab climate control unit.

3. The sugarcane harvester of claim 2, wherein the controller is further configured to regulate operation of the one or more electric machines, in order to provide mechanical power to the one or more mechanical devices based upon, at least in part, a ground speed of the sugarcane harvester.

4. The sugarcane harvester of claim 2, wherein the controller is further configured to regulate an operating speed of the cleaning fan, via the one or more electric machines, independently of a current operating speed of the engine.

5. The sugarcane harvester of claim 1, wherein identifying the operating state includes identifying a current operating speed of the engine and comparing the current operating speed of the engine with a reference engine speed; and
   wherein the one or more electric machines are caused to receive electrical power from the energy storage device based upon, at least in part, the comparing of the current operating speed and the reference engine speed.

6. The sugarcane harvester of claim 5, wherein the one or more electric machines are caused to receive electrical power from the energy storage device based upon, at least in part, the current operating speed being within an engine speed range, with respect to a target engine speed.

7. The sugarcane harvester of claim 1, wherein the controller is further configured to cause the one or more electric machines to provide energy to the energy storage device for storage based upon, at least in part, identifying a second operating state of the sugarcane harvester.

8. The sugarcane harvester of claim 7, wherein the second operating state corresponds to availability of surplus power from the engine.

9. The sugarcane harvester of claim 8, wherein the second operating state indicates one or more of an end-of-row turn of the sugarcane harvester and a waiting state of the sugarcane harvester.

10. A method for operating a sugarcane harvester, wherein the sugarcane harvester includes an engine, one or more electric machines configured to operate as at least one of a motor and a generator, and an energy storage device configured to at least one of receive electrical power from the one or more electric machines for storage, and provide electrical power to the one or more electric machines to power operation of the one or more electric machines, the method comprising:
    identifying, by one or more computing devices, an operating state of the sugarcane harvester, wherein the operating state is associated with one or more of a power requirement, a torque requirement, or an engine speed requirement for the sugarcane harvester;
    based upon, at least in part, identifying the operating state, causing, by the one or more computing devices, the one or more electric machines to receive electrical power from the energy storage device for conversion by the one or more electric machines to mechanical power;
    providing the mechanical power to one or more of a hydraulic pump and a mechanical device, in order to power an operation of the sugarcane harvester; and
    one or more of:
       operating the hydraulic pump with the mechanical power from the one or more electric machines to provide pressurized hydraulic fluid to a hydraulic machine of the sugarcane harvester in order to execute the operation; and
       receiving the mechanical power at the mechanical device directly from the one or more electric machines and operating the mechanical device with the mechanical power from the one or more electric machines to execute the operation.

11. The method of claim 10, wherein the one or more mechanical devices include one or more harvesting devices of the sugarcane harvester.

12. The method of claim 11, further comprising:
    regulating operation of the one or more electric machines, in order to provide mechanical power to the one or more harvesting devices, based upon, at least in part, a ground speed of the sugarcane harvester.

13. The method of claim 11, further comprising:
    regulating an operating speed of the one or more harvesting devices, via the one or more electric machines, independently of a current operating speed of the engine.

14. The method of claim 10, wherein identifying the operating state includes identifying a current operating speed of the engine and comparing the current operating speed of the engine with a reference engine speed; and
    wherein the one or more electric machines are caused to receive electrical power from the energy storage device based upon, at least in part, the comparing of the current operating speed and the reference engine speed.

15. The method of claim 10, further comprising:
    identifying a second operating state of the sugarcane harvester corresponding to availability of surplus power from the engine; and
    causing the one or more electric machines to provide energy to the energy storage device for storage based upon, at least in part, the identifying of the second operating state.

16. The method of claim 15, wherein the second operating state indicates one or more of an end-of-row turn of the sugarcane harvester and a waiting state of the sugarcane harvester.

17. A sugarcane harvester comprising:
an engine;
one or more harvesting devices including one or more of a cane topper, a knockdown roller, a feed roller, a basecutter assembly, a chopper drum, and a cleaning fan;
one or more electric machines configured to operate as at least one of a motor and a generator;
an energy storage device configured to at least one of receive electrical power from the one or more electric machines for storage, and provide electrical power to the one or more electric machines to power operation of the one or more electric machines; and
a controller configured to:
identify an operating state of the sugarcane harvester, wherein the operating state is associated with one or more of a power requirement, a torque requirement, and an engine speed requirement for the sugarcane harvester;
based upon, at least in part, identifying the operating state, cause the one or more electric machines to receive electrical power from the energy storage device for conversion by the one or more electric machines to mechanical power, in order to power operation of the one or more harvesting devices.

18. The sugarcane harvester of claim 17, wherein the controller is further configured to regulate operation of the one or more electric machines in order to provide mechanical power to the one or more harvesting devices based upon, at least in part, a ground speed of the sugarcane harvester.

19. The sugarcane harvester of claim 17, wherein the controller is further configured to regulate an operating speed of the one or more harvesting devices, via the one or more electric machines, independently of a current operating speed of the engine.

20. The sugarcane harvester of claim 17, wherein the controller is further configured to cause the one or more electric machines to provide energy to the energy storage device for storage based upon, at least in part, identifying one or more of an end-of-row turn of the sugarcane harvester and a waiting state of the sugarcane harvester.

* * * * *